C. FORD.
Cultivator.
No. 47,536.
Patented May 2, 1865
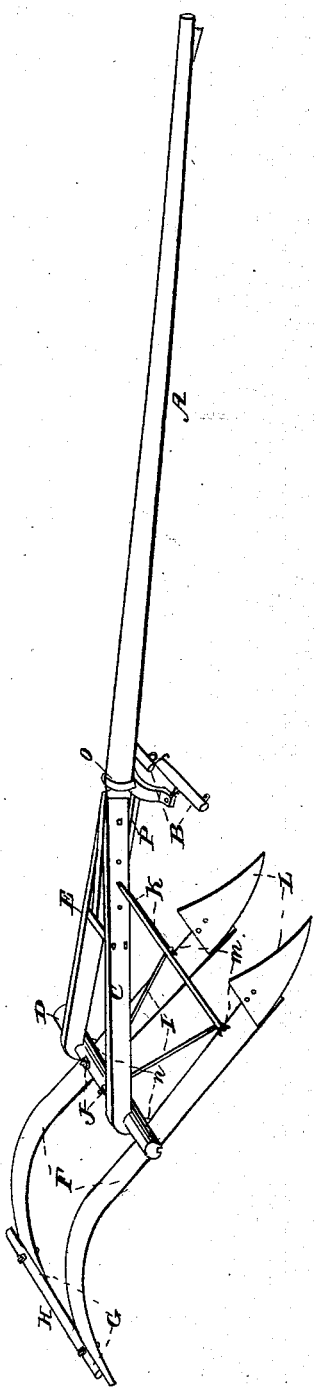

UNITED STATES PATENT OFFICE.

C. FORD, OF FOREST CITY, ILLINOIS.

IMPROVEMENT IN SHOVEL-PLOWS.

Specification forming part of Letters Patent No. 47,536, dated May 2, 1865.

*To all whom it may concern:*

Be it known that I, CHARLES FORD, of Forest City, in the county of Mason and State of Illinois, have invented a new and useful Improvement on the Two-Horse Shovel-Plow, a machine for cultivating corn; and I do hereby declare that the following is a full, clear, and exact description of the construction and operation of the same, reference being had to the annexed drawings, making a part of this specification, in which—

Figure 1 is a perspective view.

The following are the names of the parts: A, tongue; B, double-tree and single-tree; C, hounds; D, head-piece; E, cross-bar; F, shafts; G, handles; H, coupling-bars; I, braces; J, clamps; K, false colters; L, shovels; M, lower hinges; N, upper hinges; O, ring-headed bolt; P, hammer-strap.

The tongue A, hounds C, cross-bar E, and head-piece D are wood, and are firmly bolted together and constitute the frame of the plow.

The double-tree B is of a bow form, the convex side up against the under side of the tongue, and is held in its place by the ring-headed bolt O, so it cannot turn over. The ring on the head of the bolt O is passed around the tongue, and the lower end of the bolt is supported by the hammer-strap P.

On the under side of and in the head-piece D, running its whole length, is a groove.

The false colters K are made of iron and fastened firmly at the upper ends to the hounds C. At the lower ends they form eyes, (a part of the hinges M,) then extending up, (forming the braces I,) making a sharp bend, they terminate in two more eyes, which form parts of the hinges N. The upper ends of the braces I are held firmly, wherever placed, in the groove in the head-piece D by the clamps J.

The shafts F are made of wood. The upper ends, bending back, form the handles G, while on the lower ends the steel shovels L are fastened. These shafts are attached to the frame of the plow by means of eye-headed bolts that link into the upper eyes on the termination of the braces I and the lower eyes on the ends of the false colters K in such manner as to form the hinges M and N.

The coupling-bar H has a number of holes at regular distances in each end, and is attached to the handles G by small bolts, which are firm in the handles, but loose in the coupling-bar. The shovels L are flat on the face, half-diamond shape, and bent to the arc of a circle.

Operation: The plow runs astride the row, plowing a row as it goes, while the row (of corn) is between the horses. The horses are hitched to the lowest points (the ends) of the double-tree, which bend down at each end to bring the hitching-point in the line of draft—a very important matter—that makes the plow run steady and prevents the tongue from bearing down on the horses' necks. The shafts bearing the shovels, being firmly hinged to the body of the plow to render it guidable, always draw evenly, whether the horses walk so or not. The operator walks after either shovel on either side of the row of corn and holds to either handle or the coupling-bar. Any motion given to one handle is conveyed to the other by the coupling-bar. As the shafts are swung on hinges, the handles are easily drawn to the right or left. If drawn toward the left, they face the shovels to the right, causing the shovels to slide edgewise through the ground to the left, and so to the reverse—that is, the operator merely changes the face of the shovels, and then the pressure of the dirt against them guides the plow effectually. If the operator wishes to throw all the dirt to the corn, he sets the bolts in the handles farther out in the holes in the coupling-bar, so the shovels shall face together. If he wishes to throw the dirt from the corn, he sets the bolts in on the coupling-bar, so the shovels shall face from each other. If he wishes to throw the dirt evenly both ways, he sets the handles the same distance apart on the coupling-bar that the hinges N and N or M and M are, so the shovels shall face to the front. If he wishes to change the width between the shovels, he loosens the clamps J and slips the tops of the braces in the groove in the head-piece and tightens the clamps again. If he wishes to drag the plow from place to place, he throws it over on its side, when the shovel underneath faces down and slides over the ground. At the same time the ring-headed bolt O turns on the tongue, so the double-tree carries level, notwithstanding the position of plow.

I do not claim the two-horse shovel-plow as a plow that runs astride the row, or the tongue, or the shovels.

What I claim as my invention, and desire to secure by Letters Patent, is—

1. The mode of making an even-draft two-horse shovel-plow, as herein described, with the shafts F attached to the frame by the hinges M and N, and connected by the coupling-bar H, which arrangement, while it holds the shovels evenly, enables the operater to change the face of the shovels at will, and thereby guide the plow.

2. The false colters K, in connection with the braces I, made to slide in the groove in the head-piece D, and secured by the clamps J, as herein set forth, in such manner that the operator, by loosening the clamps J, may change the width between the shovels by sliding the tops of the braces in the groove.

3. The ring-headed bolt O, for holding the double-trees on the plow, substantially as herein set forth, in such manner that when the plow is thrown on its side they will balance, remaining parallel to the neck-yoke.

CHARLES FORD.

Witnesses:
 THEOPHILUS MAY,
 J. T. VAN ORMAN.